(12) United States Patent
Yamamoto

(10) Patent No.: US 6,300,972 B1
(45) Date of Patent: Oct. 9, 2001

(54) VIDEO CARD AND VIDEO DATA COMMUNICATION APPARATUS

(75) Inventor: Kaichi Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/995,477

(22) Filed: Dec. 22, 1997

(30) Foreign Application Priority Data

Dec. 27, 1996 (JP) .................................................. 8-350358

(51) Int. Cl.[7] .............................................. H04N 7/14
(52) U.S. Cl. .................................. 348/14.08; 348/14.09; 710/1
(58) Field of Search ................................ 348/14, 15, 552, 348/14.01, 14.02, 14.03, 14.04, 14.05, 14.06, 14.07, 14.08, 14.09; 710/1, 2; 345/330; 709/204, 205

(56) References Cited

U.S. PATENT DOCUMENTS 6,026,217 * 2/2000 Adiletta ........................... 395/200.77

* cited by examiner

Primary Examiner—Curtis Kuntz
Assistant Examiner—Melur Remakrishnaiah
(74) Attorney, Agent, or Firm—Frommer Lawrence & Haug LLP.; William S. Frommer; Bruno Polito

(57) ABSTRACT

A video card capable of being mounted in an information processing apparatus so as to enable suitable performance of a television conference system etc., wherein video data fetched into a video card from a camera by a capture operation is recorded in the first region of a DRAM and encoded at a signal processing unit. The encoded video data is recorded in the second region of the DRAM, sequentially transferred to a main memory of a notebook type PC, and transmitted to a network via a communication I/F card. The video data received from the network is stored once in the main memory, transferred to the fourth region of the DRAM of the video card, decoded at the signal processing unit, and recorded in the third region of the DRAM. Immediately before the next capture operation, the video data which was fetched into the first region of the DRAM before this and the received video data which has been recorded in the third region are displayed on a display via a VGA controller.

23 Claims, 7 Drawing Sheets

VIDEO CARD AND VIDEO DATA COMMUNICATION APPARATUS

BACKGROUND OF THE INVENTION

1. Field of the Invention

The present invention relates to a card-shaped processing apparatus used by mounted in a personal computer or the like, more particularly relates to a video card capable of suitably carrying out an input/output, encoding/decoding, and communication processing of video data, and to a video card communication apparatus suitable for carrying out a video conference and constituted using the video card.

2. Description of the Related Art

Advances made in image processing technology and communication technology are leading to the realization of television telephone systems and television conference systems.

On the other hand, advances in semiconductor technology have resulted in rapid progress in the improvement of performance and reduction of size of data processing apparatuses. High performance personal computers having performances comparable to a conventional mainframe computers and smaller notebook type personal computers (notebook type PCs) etc. have been developed and have spread widely. Further, even the peripherals connected to such personal computers are being made in the form of cards. Cards are in particular now becoming one of the main means for adding functions to notebook type PCs. Further, these cards have been improved in function from memory cards containing a memory and just functioning as recording medium to IC cards having specific processing functions.

Almost all of the above conventional television telephone systems and television conference systems have been large in size of hardware and high in price and therefore have not been systems which can be easily utilized by the general public. In order to realize such functions, further, real time processing of pictures, particularly moving pictures, becomes necessary, but this kind of processing involves an enormous amount of data and demands high speeds. For this reason, even though progress has been made in improvement of performance, the load thereof is not small by any means even in the computer devices as mentioned above. Usually, such functions are realized by dedicated image memories, dedicated processors, or dedicated processing apparatuses having DSPs or the like.

SUMMARY OF THE INVENTION

An object of the present invention is to provide a video card capable of carrying out processing in the transmission and reception of video data such as handling of images, encoding/decoding, and communication simultaneously for both of the transmission and reception in real time and capable of providing an environment where a television telephone system, a television conference system, etc. can be suitably realized together with an information processing apparatus when mounted in the information processing apparatus.

Further, another object of the present invention is to provide a video data communication apparatus capable of suitably carrying out processing accompanying real time bi-directional communication of video data by a simple configuration, that is, an inexpensive configuration, and thereby capable of realizing a television telephone system, a television conference system, etc.

To attain the above objects, according to a first aspect o the present invention, there is provided a video card comprises a semiconductor memory, a camera signal inputting means to which a camera is connected and for converting video signals input from the camera to an intended format and recording the same in the memory, an encoding means for encoding the input video signals and recording the encoded video signals in the memory, a first transmitting means for transmitting the encoded video signals to the host controller, a receiving means for receiving the encoded video signals transmitted from the host controller and recording the same in the memory, a decoding means for decoding the encoded video signals and recording the decoded video signals in the memory, a second transmitting means for transmitting the decoded video signals to the host controller, a third transmitting means for transmitting the video signals before encoding input from the camera to the host controller, and a controlling means for making predetermined means valid based on a control signal input from the host controller to make them carry out the intended processings, and the encoding means and the decoding means are constituted substantially by one signal processing means such as a programmable DSP, and the first to third transmitting means and the receiving means are constituted substantially by one interface means according to the PCM-CIA standard.

Preferably, the signals in the video card operate independently from the host controller in synchronization with an internal television synchronization signal.

Further preferably, the memory is constituted so as to be able to record the video signals input from the camera, the encoded video signals, the encoded video signals input from the host controller, and the decoded video signals in predetermined regions and carry out the read/write of the data to and from the regions substantially independently by a memory control circuit having a plurality of address counters.

Specifically, the controlling means defines the internal state of the video card by variables such as the operation mode and flag and uses these to carry out the control. Namely, it is constituted by a register recording these variables, a logic circuit carrying out operations under easy conditions etc. based on this, and a signal processing means carrying out signal processing according to a predetermined procedure based on the same.

Also preferably, the controlling means simultaneously makes the camera signal inputting means and the encoding means valid according to need so as to enable simultaneous recording of the video signals input from the camera device in the memory means and the encoding of the video signals.

Further preferably, the controlling means simultaneously makes the second transmitting means and the third transmitting means valid, and the interface means transmits the decoded video signals and the input video signals to the host controller substantially by one transmission processing.

Furthermore preferably, the controlling means makes the first transmitting means valid simultaneously with the camera signal inputting means, the encoding means, and the decoding means according to need, and the first transmitting means reads the encoded video signals from the memory means in horizontal and vertical blanking periods of the video signals when the means carry out the reading and recording with respect to the memory means and transmits the same to the host controller.

Further preferably, the controlling means makes the receiving means valid simultaneously with the camera signal inputting means, the encoding means, and the decoding means according to need, and the receiving means receives the encoded video signals transmitted from the host control device in horizontal and vertical blanking periods of the video signals when the means carry out the reading and recording with respect to the memory means and records the same in the memory.

Further specifically, the interface means is a means for carrying out communication with the host control device based on the PCMCIA standard and has a basic inputting/ outputting means for carrying out the transmission of video signals input from the camera signal input unit and encoded and the reception of the encoded video signals, a format converting means for converting the video signals input from the camera signal input unit and the video signals received at the receiving means and decoded at the decoding means to a format which can be immediately displayed on a display device of the host control device, and a ZV port outputting means for transmitting the format-converted video signals.

According to a second aspect of the present invention, there is provided a video data communication apparatus comprising the video card and a control device, which comprises transmission use video signal acquiring means on which the video card is mounted and for acquiring in the video card the video signals which are input from the camera device and encoded as the transmission use video signals, a transmitting means for transmitting the acquired video signals via a communication line, a receiving means for receiving the encoded video signals via the communication line, a decoding instruction means for inputting the received encoded video signals to the video card to make this decode the same, a display use video signal acquiring means for reading the decoded video signals and video signals which are input from the camera device but are not encoded from the video card as the display use video signals, and a displaying means for displaying the acquired video signals.

Preferably, the control device issues instructions to the video card for making the means of the video card valid, and the video card operates independently based on the instructions.

Also preferably, the video card further has a synchronization signal generating means for generating a predetermined television synchronization signal determined based on the video signals, and the means of the video card operate by the synchronization signal independent from the control device.

Further preferably, transfer of video signals between the control device and the video card is carried out in horizontal and vertical blanking periods of video signals during which the memory means is accessed by processing when processing is carried out in the camera signal inputting means, the encoding means, and the decoding means of the video card.

Furthermore preferably, a transmission time of video signals of one frame which are transmitted and received via the communication line is larger than and almost equal to a total time of an encoding time of video signals of one frame in the encoding means of the video card, a decoding time of the video signals of one frame in the decoding means of the video card, and a time for transferring one frame's worth of video signals to the display use video signal acquiring means of the control device from the video card.

BRIEF DESCRIPTION OF THE DRAWINGS

These and other objects and features of the present invention will become more apparent from the following description of the preferred embodiments given with reference to the attached drawings, wherein:

FIGS. 7A and 7B are views of the state of processing in full duplex communication, in which FIG. 7A is a view of the state of processing when a delay of the network is defined as Δ, and FIG. 7B is a view of the state of processing when a station A adds an excess delay δ to an actual network delay Δ to adjust the phase of the transmit/receive operation in the terminal.

DESCRIPTION OF THE PREFERRED EMBODIMENTS

An explanation will be made of an embodiment of the present invention by referring to FIG. 1 to FIGS. 7A and 7B.

In the embodiment, the present invention will be explained by using a case where a television conference system is realized by a video data communication apparatus according to the present invention constituted by mounting the video card according to the present invention in a notebook type PC.

Configuration of Video Data Communication Apparatus

First, an explanation will be made of the configuration of the video data communication apparatus by referring to FIG. 1.

Figure 1:
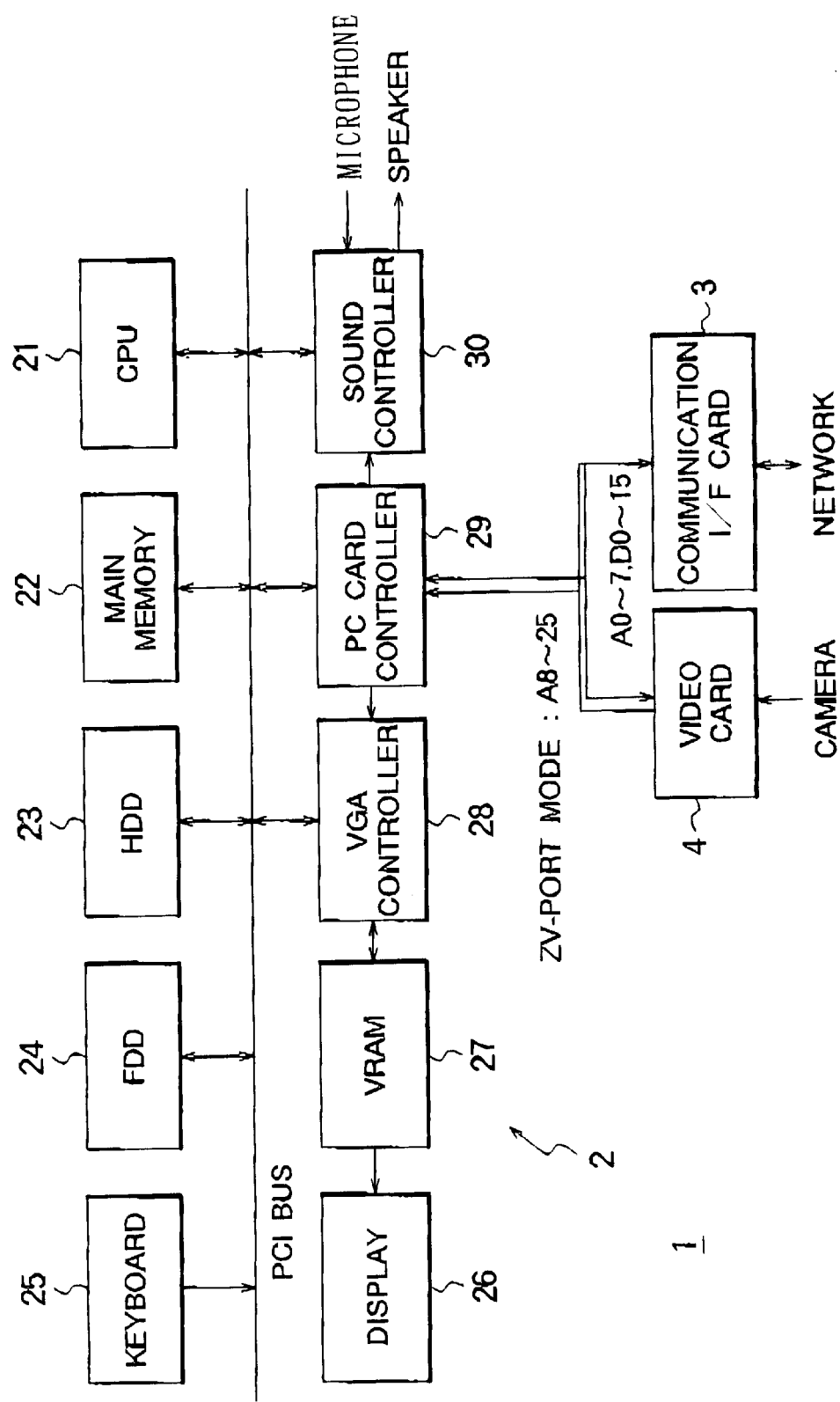
FIG. 1 is a block diagram of the configuration of a video data communication apparatus of an embodiment of the present invention.

FIG. 1 is a block diagram of the configuration of a video data communication apparatus 1.

The video data communication apparatus 1 is configured with a communication interface (communication I/F) card 3 and a video card 4 inserted into PCMCIA (standard memory card specification for portable computers established by the Personal Computer Memory Card International Association) card slots of a notebook type PC 2.

The notebook type PC 2 is a usual computer device having a monitor of a VGA resolution and having two or more slots as the PCMCIA card slots and includes a CPU 21, a main memory 22, a hard disc drive (HDD) 23, a floppy disc drive (FDD) 24, a keyboard 25, a display 26, a video RAM (VRAM) 27, a VGA controller 28, a PC card controller 29, and a sound controller 30 connected via a PCI bus.

Further, a microphone and a speaker are mounted at the sound controller 30, and a camera head is mounted at the video card 4.

The flow of the video data in such a video data communication apparatus 1 will be simply explained next.

When transmitting video data to an external apparatus via a network, the video data sent from the camera head is compressed in the video card 4 and transferred to the PC card controller 29. The compressed video data transferred to the PC card controller 29 is input to the main memory 22, transferred again from here to the communication I/F card 3 via the PC card controller 29, and transmitted to the network.

Further, the video data received from the network is input once to the main memory 22 from the communication I/F card 3 through the PC card controller 29. Thereafter, the data is transferred again to the video card 4 via the PC card controller 29. Then, the compressed video data is expanded in the video card 4, input again to the VGA controller 28 via the PC card controller 29 through the ZV port, and further displayed on the display 26 via the VRAM 27.

Namely, when transmitting video data to an external apparatus via a network, the data flows from the camera head to the video card 4 to the PC card controller 29 to the main memory 22 to the PC card controller 29 to the communication I/F card 3 and to the network.

Also, when receiving video data from an external apparatus via a network, the data flows from the network to the communication I/F card 3 to the PC card controller 29 to the main memory 22 to the PC card controller 29 to the video card 4 to the PC card controller 29 to the VGA controller 28 to the VRAM 27 to the display 26.

Note that there also exists a case where the video data per se entering from the camera head is transferred as it is via the ZV port to the PC card controller 29 and input to the VGA controller 28, for example, when it is intended to watch the video data transmitted from one's own terminal in a television conference system.

Further, the audio data is picked up by the microphone and input to the sound controller 30 where it is then processed and transferred to the main memory 22. The processings after the main memory 22 are the same as those of the case of the video data. Further, at the time of reception, the audio data is transferred completely reversely to this and finally output to the speaker by the sound controller 30.

Video Card 4

Next, an explanation will be made of the configuration of the video card 4 by referring to FIG. 2.

Figure 2:
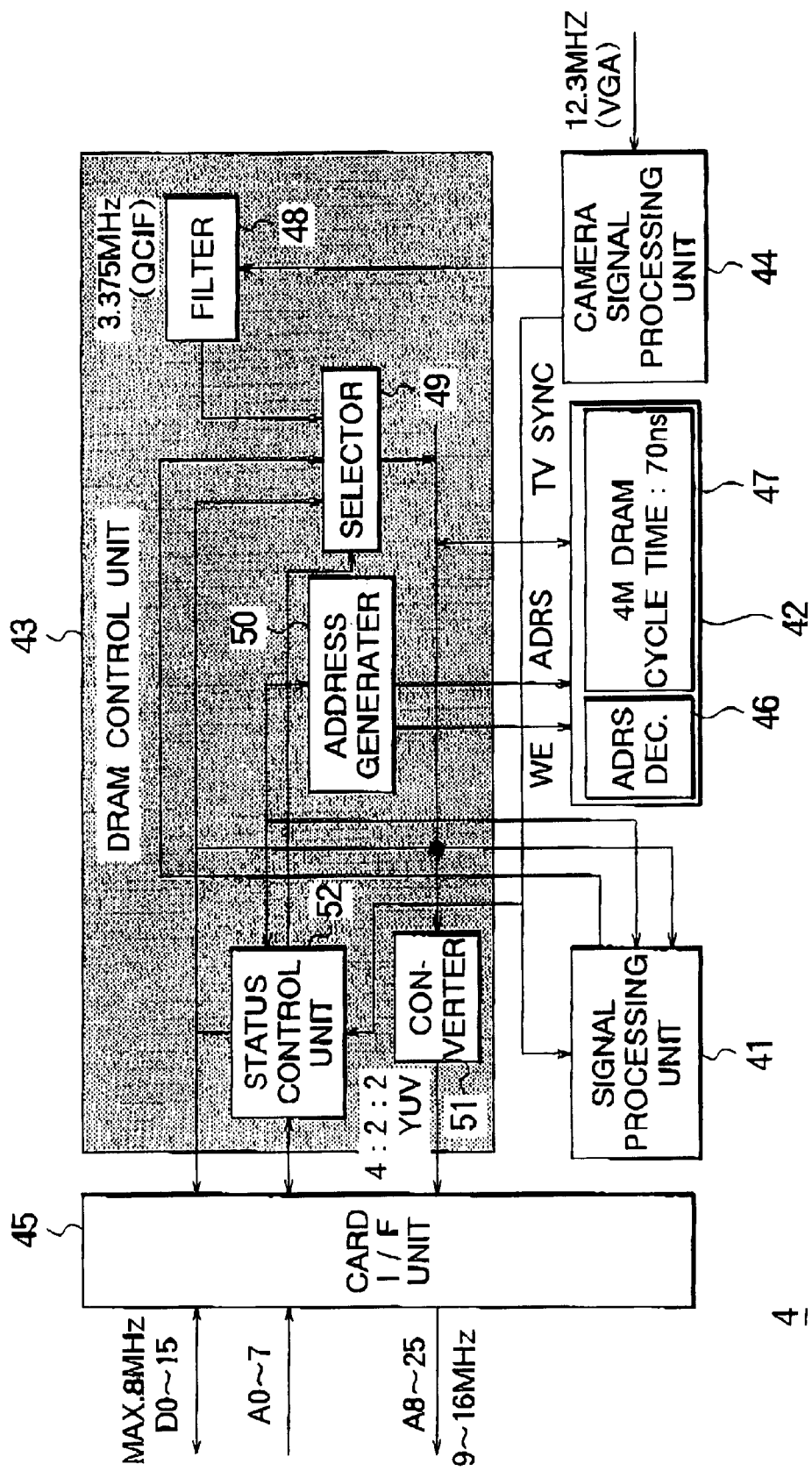
FIG. 2 is a block diagram of the configuration of a video card shown in FIG. 1.

FIG. 2 is a block diagram of the configuration of the video card 4.

The video card 4 has a signal processing unit 41, a DRAM unit 42, a DRAM control unit 43, a camera signal processing unit 44, and a card interface (card I/F) unit 45. The DRAM control unit 43 has a filter 48, a selector 49, an address generator 50, a converter 51, and a status control unit 52, supplies an address (ADRS) and write enable signal (WE) to the DRAM unit 42, and reads the data from a designated address or writes the data to the designated address.

Overall Configuration of Video Card 4

First, an explanation will be made of the function of the units of the video card 4.

The signal processing unit 41 is a signal processing circuit carrying out the processing for encoding and decoding of the input video data and the control of the video card 4. The signal processing unit 41 is substantially a programmable DSP and operates according to a control program recorded in advance.

The DRAM unit 42 is a memory unit comprising a DRAM 47 recording the video data and an address decoder 46 thereof. In the present embodiment, as the DRAM 47, one 4M bit DRAM of a cycle time of 70 ns is mounted.

The DRAM control unit 43 is a logic circuit carrying out various processings with respect to pictures which are stored or are to be stored in the DRAM unit 42.

The filter 48 converts the VGA picture input from the camera signal processing unit 44 to a QCIF/CIF picture.

The selector 49 selects the signal input from either of the filter 48, the signal processing unit 41, and the card I/F unit 45 and outputs the same to the bus in the DRAM control unit 43.

The address generator 50 manages the addresses for access of the DRAM 47. It manages the addresses in accordance with the configuration of the DRAM 47 explained later and in accordance with each read/write operation.

The converter 51 converts a 4:1:1 YUV system signal to a 4:2:2 YUV signal system in real time for outputting the not encoded video data via the ZV port of the card I/F unit 45 in a case where the video signals for display on the display 26 of the notebook type PC 2 are output etc.

The status control unit 52 is constituted by a register and a simple logic circuit and is involved in the control of the video card 4 together with the signal processing unit 41. In the register, various flags showing internal states of the video card 4 mentioned later, parameters regarding the operation of the video card 4, the operation mode at this time, etc. are stored. Further, the logic circuit is a circuit for detecting the transition of the state and the conditions of processing carried out in the signal processing unit 41 based on the contents of the register etc.

The camera signal processing unit 44 is connected to an external television camera, converts the input analog signal to a digital signal, and inputs the same to the DRAM control unit 43.

The card I/F unit 45 is an interface unit of the CPU 21 of the notebook type PC 2 and the video card 4, issues commands to the internal block, or reports the state thereof to the CPU 21. Specifically, this is a PCMCIA interface usually used for a memory card. In this interface, the ZV port is selected by the mode designation, so it becomes possible to directly transmit the 4:2:2 YUV signal to the PC card controller 29.

Configuration of DRAM 47

Here, the configuration of the DRAM 47 will be explained in further detail.

All of the H.320/322/323/324 standards handled by the video data communication apparatus 1 are aimed at QCIF (176×144) pictures. Further, in the case of the 4:1:1 YUV signal system, one frame's worth of image data can be stored by VGA in a 4M DRAM, while four frames' worth of image data can be stored by QCIF. Accordingly, in the present embodiment, the 4M bit DRAM 47 is equally divided into four regions A to D in which video data is respectively recorded by QCIF signals.

The region A is a region for storing the video data taken by the camera. The video data stored in this region is supplied to the signal processing unit 41 for compression or output to the ZV port of the card I/F unit in accordance with a request of the CPU 21.

The region B is a region for writing the data after compression. When a certain constant amount of data is written, transfer to the main memory 22 is commenced in accordance with a request of the CPU 21.

The region C is a region for writing the data after the expansion. When all of the writing is finished, the restored image data is transmitted in real time to the ZV port of the card I/F unit in accordance with the request of the CPU 21.

The region D is a region for writing the reception data sent from the main memory 22 of the CPU 21 via the PCI bus.

Note that when carrying out a video conference by full duplex communication or the like, the region A and the region C read the video data and transmit the same to the ZV port by time division processing in the same frame period.

SUMMARY OF OPERATION

Next, an explanation will be made of the operation carried out in the video card 4.

First, a brief explanation will be made of the main operations carried out in the video card 4.

In this video card 4, the operations shown in Table 1 are carried out.

TABLE 1

| Capture |
| --- |
| Local display |
| Encoding |
| Transmit |
| Receive |
| Decoding |
| Remote display |

"Capture" is an operation for fetching the picture and writing the same in the DRAM 47 in real time.

"Local display" is an operation for reading the fetched picture in accordance with the request of the CPU 21 and transmitting the same from the ZV port of the card I/F unit 45.

"Encoding" is an operation for writing the fetched picture in the region B after reading the same from the region A of the DRAM 47 and executing the compression.

"Transmit" is an operation for reading the compressed data from the region B of the DRAM 47 and transmitting the same via the PCI bus to the main memory 22. Note that the compressed data transmitted to the main memory 22 is usually transmitted to the communication I/F card 3 by the CPU 21.

"Receive" is an operation for receiving the encoded video data sent to the main memory 22 via the communication I/F card 3 via the PCI bus and writing the same in the region D of the DRAM 47.

"Decoding" is an operation for reading and expanding the compressed image data which is received and written in the region D of the DRAM 47, restoring it to the original data, and writing the same in the region C of the DRAM 47.

"Remote display" is an operation for reading the image data finished being expanded by the decoding in real time in accordance with the request from the CPU 21 and transmitting the same from the ZV port of the card I/F unit 45.

Operation Mode

Next, an explanation will be made of various conditions which are defined in the video card 4 and appropriately set for carrying out such operations.

First, an explanation will be made of the operation modes showing the basic operation conditions and objects of operations of the video card 4.

The video card 4 has the operation modes as shown in Table 2.

TABLE 2

| Stand-by mode |
| --- |
| Capture mode |
| Display mode |
| Communication mode |
| Single/sequence mode |
| |
| Full duplex/semi duplex |
| Only transmit |
| Only receive |
| Special processing mode |
| Image processing |
| |
| Gaussian filter |
| Color base conversion |
| Graphics |
| |
| Rotate |
| Enlarge/reduce |

The video card 4 enters into the stand-by mode when the power is turned ON and waits for a command from the CPU 21. The mode for just fetching the picture is the "capture" mode, and the mode for outputting the contents of the DRAM 47 from the ZV port of the card I/F unit 45 in real time is the "display" mode.

The "single mode" in the "communication mode" is an operation mode for sending, for example, a single picture on a spot basis. The "sequence mode" is an operation mode for successively sending pictures by sequential processing and is suited for video conferences etc. In the "communication mode", the "capture/display mode" is include as a series of operations.

Further, the "special processing mode" is the mode for applying specific processing to specific data in the DRAM 47 off line.

Parameters

Further, the video card 4 has some parameters set from the notebook type PC 2 in order to carry out the operations as mentioned above.

The principal parameters among them are shown in Table 3.

TABLE 3

| Parameters |
| --- |
| VGA/CIF/QCIF |
| Compression rate |
| Prefiltering |
| Transmission speed |

Internal State and Status Flags

The video card 4 has a group of flags clarifying the operation state and internal state thereof which are referred to when actually executing various detailed processings according to the operation modes and parameters as mentioned above.

The principal flags among them, the factors for turning on these flags (sometimes also referred to as "setting the flags"), and the factors for turning off the flags are shown in Table 4. Below, an explanation will be made of such flags and the states indicated by the flags.

TABLE 4

| Status flag | On/off | Factor |
| --- | --- | --- |
| Stand-by | On | Power supply ON. Command from CPU. |
| | Off | Direct command from CPU or other operation command. |
| Capture | On | Direct command from CPU. |
| | Off | Direct command from CPU. Self reset after fetching of one frame. |
| Local ready | On | Falling of Capture Flag. |
| | Off | Direct command from CPU or falling of Capture Flag. |
| Local display | On | Command from CPU when Local Ready Flag is on. |
| | Off | Self reset by subsequent vertical synchronization signal. |
| Encoding | On | Start execution when Capture Flag is on. In actuality, after elapse of 8 lines. |
| | Off | Self reset after ending of one frame. |
| Transmit | On | Command from CPU |
| | Off | Self reset after transfer of required amount of data. |
| T-Finish | On | Set after ending of transfer of one frame. |
| | Off | Reset by command from CPU. |
| Receive | On | Command from CPU. |
| | Off | Self reset after transfer of required amount of data. |
| R-Finish | On | Set after end of transfer of one frame. |
| | Off | Reset by command from CPU. |
| Decoding | On | Start execution under condition of Encoding Flag off and Receive Flag on. |
| | Off | Set after end of transfer of one frame. |
| Remote ready | On | Falling of Decoding Flag. |
| | Off | Direct command from CPU or rising of Decoding Flag. |
| Remote display | On | Command from CPU when Remote Ready Flag is on. |
| | Off | Self reset by subsequent vertical synchronization signal. |

The stand-by state is a state of waiting for a new command. The stand-by Flag is made on when the power is turned on or by a command of the CPU 21.

The capture state is a state for fetching a picture into the internal DRAM 47. The fetching of the picture is commenced in synchronization with the vertical synchronization signal immediately after receiving a command from the CPU 21. Further, the capture flag becomes ON when receiving the command and becomes OFF by the subsequent vertical synchronization signal.

The local ready flag becomes on when this capture flag becomes off and is maintained in its on state so far as the contents of the DRAM 47 are not updated. Namely, this flag is a flag showing that there is valid data in the DRAM 47. Note that the flag becomes off immediately after the power is turned on or during the update of the data.

The local display state is a state where the data fetched into the DRAM 47 is transmitted from the ZV port of the card I/F unit 45 in real time. When the local ready flag is on at the time of the display mode or communication mode, if there is a command from the CPU 21, the local display flag is set and this state is entered. Further, the local display flag is self-reset after the completion of the operation.

The Encoding State is a state where the fetched image data is subjected to encoding. The processing is commenced when the capture flag becomes on at the time of the communication mode. When this state is entered, after the elapse of eight horizontal periods, the encoding state flag (encoding flag) is set and the image data is read from the region A of the DRAM 47 and transferred to the signal processing unit 41. The signal processing unit 41 carries out the encoding and transfers the compressed data to the region B at any time. The data is multiplexed with the capture operation in the sampling period and executed. When the processing is completed, the encoding flag is turned off by itself.

The transmit state is a state where the data is transferred to the main memory 22 of the notebook type PC 2 from the video card 4. If there is a request from the CPU 21 during the horizontal/vertical blanking period during an encoding operation, the transmit flag is set and the data is transferred from the region B of the DRAM 47 to the main memory 22. Each time the transfer of the sample requested by the CPU 21 is finished, the transmit flag is turned off. When all of the compressed data is read, a transmit finish flag (T-finish flag) is turned on.

The transmit finish flag (T-finish flag) is a flag showing that the data transmission of one image is finished and becomes on when the reading of all of the compressed data of one image is finished as mentioned above. Further, after this, the flag is turned off by a signal from the CPU 21.

The receive state is a state where the image data is transferred from the main memory 22 to the video card 4. It is entered by a command from the CPU 21 during the horizontal/vertical blanking period at the time of a full duplex or receive only communication mode. Based on the command from the CPU 21, the receive flag is set and the data of the designated number of samples starts to be received from the main memory 22. When the reception is finished, the receive flag is turned off. When one frame's worth of data finishes being received, the receive finish flag (R-finish flag) is turned on.

The receive finish flag (R-finish flag) is a flag showing that the reception of one frame of the image data is finished and becomes on when the reception of one frame's worth of data is finished as mentioned above, and then made off by the signal from the CPU 21.

The decoding state is a state for carrying out the decoding for the received and compressed video data. It sets the decoding flag when receive flag is high and encoding flag is off. When entering into this state, a read address counter RD of the reading region D of the address generator 50 starts to work, sends the reception data from the DRAM 47 to the signal processing unit 41, and enters the expansion work. The expanded data is transferred to the region C of the DRAM 47. When the transfer of one frame's worth of the data is finished, the decoding flag is once turned off and the remote-ready flag is set.

The remote-ready flag is a flag showing that there is valid data in the DRAM 47. It is maintained in its on state when there is valid data in the DRAM 47 in the same way as the local-ready flag. Further, it becomes off immediately after the power is turned on or during an update.

The remote display state is a state where the restored picture of the region C is read in real time and transmitted from the ZV port of the card I/F unit 45. When there is a command from the CPU 21 when the remote-ready flag is on, it turns the remote display flag ON. The remote display flag is self-reset after the completion of the operation.

Control System of Video Data Communication Apparatus 1

In the video card 4 having such a configuration and a video data communication apparatus 1 having this, the autonomous control in the video card 4 and the overall control by the CPU 21 of the notebook type PC 2 work together for the communication of the video data communication apparatus 1 and the encoding and decoding of the image data.

In order to carry out a video conference by full duplex communication by a simple circuit like the video card 4. the control in the video card 4 and the CPU 21 must be efficiently linked with each other.

Below, an explanation will be made of such a control system according to the present invention.

Note that, in the configuration of the present embodiment, that is, in a system where the video card 4 is mounted in a notebook type PC 2, the control in the CPU 21 means control and processing at the application level.

Basic Control Method

First, an explanation will be made of the policy regarding the control and operations of various processing in the video card 4 in the video data communication apparatus 1 having such a configuration, the control, sharing of the processing with the video card 4 and the method of control of the video card 4 in the CPU 21. These are methods for efficient control in a resource-poor condition.

First of all, in the video data communication apparatus 1, the overall control over video conferencing, video capture, and other functions and operations of the video data communication apparatus 1 as a whole is carried out by the CPU 21, that is, at the application level, even with respect to the video card 4, but the timing of execution of the actual processing in the video card 4 is controlled based on a TV synchronization signal generated in the video card 4.

Second, control is exercised so that a receiving operation is carried out prior to a transmission operation at the time of communication with an external apparatus via the network. In the video data communication apparatus 1, processing is carried out making effective use of limited resources, so the apparatus is often in the busy state. To secure a good response even in such a case and reduce the drop in efficiency due to wait for response, receiving operations are given priority.

Third, connection of the notebook type PC 2 and the video card 4 is avoided as much as possible. Namely, by increasing the autonomy of the video card 4 and having it autonomously carry out detailed operations according to basic instructions from the application level, the overhead due to handshaking is reduced and the units are made to function with a high efficiency.

Fourth, interference between the time series operations of the transmission side between the main memory and the video card in the operations in the video card 4 and those of the reception side is avoided as much as possible. Namely, so far as there is no instruction from the application level, transmission or reception operations between the main memory 22 and the video card 4 are continued, once started, until the series of operations is completed. As a result, the control of the time division multiplex processing of the transmission or reception will depend not upon the video card 4, but upon the CPU 21 side.

Fifth, both of the transmission and reception with an external apparatus via a network are controlled in a manner reducing the throughput as much as possible.

Sixth, extreme multiplex processing is avoided. The degree of multiplexing is suppressed to 2 at the highest.

Based on such a basic policy, the video card 4 and the CPU 21 of the notebook type PC 2 carry out various processing in cooperation.

Further, according to such a policy, the transmission time Tn of one frame in full duplex communication is set to a whole multiple of one frame time satisfying equation 1.

$$Tn \geq (\text{Encoding Time})+(\text{Decoding Time})+(\text{Display Time}) \quad (1)$$

Control Commands

Based on such a policy, the CPU 21 of the notebook type PC 2 carries out the intended processing while suitably issuing commands to the video card 4. The commands output from the CPU 21 to the video card 4 used at that time are shown in Table 5.

TABLE 5

| Number | Command | Object and contents |
|---|---|---|
| 1 | Stand-by On | Place in idling/stand-by state |
| 2 | Stand-by Off | Release operation freeze |
| 3 | Capture On | Start fetching image |
| 4 | Local Ready On | Image source becomes necessary at time of CPU |
| 5 | Local Ready Off | Same as above |
| 6 | Display Local | Send local image to VGA controller |
| 7 | Encode | Start compression |
| 8 | Read Data (Transmit) | Read from buffer on card |
| 9 | Read T-Fin Flag | Confirmation of completion of read operation |
| 10 | Write Data (Receive) | Write into buffer on card |
| 11 | Read R-Fin Flag | Confirmation of completion of write operation |
| 12 | Decode | Start of expansion |
| 13 | Remote Ready On | Image source becomes necessary at time of CPU |
| 14 | Remote Ready Off | Same as above |
| 15 | Display Remote | Send remote image to VGA controller |

Note: "Display Local/Remote" are simultaneously executed at time of bi-directional communication mode.

At the time of the real time bi-directional communication mode, the capture operation starts by first activation of the CPU 21, but when the apparatus starts to receive data from an external apparatus via the network, in order to make the phase relationship of operations between the transmission side and the reception side via the network proper, the CPU 21 side views the amounts of the reception data and the transmission data in the main memory 22 as opposed to the network and if the receiving amount is greater suppresses issuance of a capture command.

The CPU 21 does not intervene in the on/off switching of the local/remote ready flags in most cases, but when the image source is at the CPU 21 side and it is desired to process it on the card off line and then send it to the VGA controller 28 for display, the CPU 21 must be directly turned on and issue the display local command. After the end of the operation, the CPU 21 turns off.

Similarly, the CPU 21 does not intervene in the on/off switching of the encoding or decoding operations at the time of a real time communication, but is provided for when it is desired to process data off line in the same way as the above description.

Flags corresponding to these commands are provided on the card. Among them, there are many flags autonomously set or reset on the card. This is because real time operation is involved and it is preferred to autonomously set or reset them on the card in the sense of reduction of the load of the CPU 21.

Operation Rules of Video Card 4

Then, based on this policy, the video card 4 controls operations by the following policy.

First, the video card 4 executes all operations based on the TV synchronization signal on the video card 4.

Next, the transmission side executes the encoding operation and the transmit and receive operations between the main memory 22 and the video card 4 while carrying out a capture operation in order to raise the throughput. The reception side finishes the decoding operation immediately after the completion of the receive operation.

Further, one signal processing unit 41 is used, therefore the encoding and decoding operations are exclusionary in relationship.

Regarding the display, the local display and remote display operations are executed simultaneously immediately after the completion of the decoding operation.

Further, priority is given to a receive operation. A capture operation is permitted immediately after the display of the reception data is finished.

Multiplex Processing

In order to actually carry out control with such a policy, operations which can be simultaneously executed in the video card 4, that is, processings which can be multiplexed, are defined as shown in Table 6. Note that, in Table 6, the "o" mark shows that simultaneous execution is possible, while no mark means that simultaneous execution is forbidden.

TABLE 6

| Function | Cap. | Local D. | Enc. | Trans. | Receive | Dec. | Remote D. |
| --- | --- | --- | --- | --- | --- | --- | --- |
| Capture | ⊙ | | o | o* | o* | | |
| Local D. | | ⊙ | | | o* | | o |
| Encoding | o | | ⊙ | o* | o* | | |
| | | | | o* | o* | | |
| Transmit PCI Bus | o | | o | ⊙* | o* | | |
| | | | | o | o* | | |
| Receive PCI Bus | o | | o | o* | ⊙* | | |
| | | o | | | o* | | o |
| | | | | o | o* | | |
| | | | | o* | | o | |
| Decoding | | | | o* | o* | ⊙ | |
| Remote D | | o | | | o* | | ⊙ |

Note: o* and ⊙* denote execution during horizontal/vertical blanking periods.

A capture operation carries out time division multiplex processing for the encoding and transmit operations for the reduction of the throughput in the QCIF communication mode. At this time, the local display operation following the capture operation is carried out after the encoding and transmit operations are finished although some simultaneousness is lost.

A capture operation is carried out at a sampling cycle of 790 ns. Encoding is multiplexed in this. Transmit and receive operations are executed in the horizontal blanking period. By this, triplicate processing is avoided so the delay does not become that great. Note that a subsequent capture operation is executed by a frame immediately after the local display and remote display operations are finished.

A local display operation is executed simultaneously with a remote display operation. Accordingly, they are not multiplexed with the transmit and decoding operations. Further, since the next frame can start to be received during a local display operation, it must be made possible to simultaneously execute a receive operation.

Encoding continues even after the capture operation is completed, but it must be possible to simultaneously execute a transmit and receive operation. Note that priority is given to an encoding operation and that a transmit and receive operation are executed in the horizontal/vertical blanking periods. Time is distributed in this according to the instructions of the application.

The transmit operation after the completion of the encoding operation is finished at the latest within the vertical blanking period of the next frame.

A receive operation is an operation to which the highest priority must be given as explained above. In this sense, multiplexing with other operations is permitted to the highest degree. Time division multiplexing is carried out with a transmit operation under the instructions from the CPU 21. Accordingly, these are regarded as one operation. In addition, these are executed in only the horizontal/vertical blanking periods. The simultaneous execution is controlled so that the substantive degree of multiplexing never exceeds 2.

The signal processing unit 41 is made to carry out two roles so as to lower costs, consequently the encoding and decoding operations are exclusionary in relationship, but simultaneous execution of transmit and receive operations is made possible.

A remote display operation is instructed in synchronization with the closest vertical synchronization signal after the CPU 21 learns of the completion of the decoding operation. It starts to be executed with the highest priority. A remote display operation can overlap a slightly remaining transmit operation and a receive operation for fetching the next group of reception data into the DRAM 47. At this time, the transmit and/or receive operations are executed in the horizontal/vertical blanking periods.

Note that a capture operation is postponed at the stage where the receive operation is remarkably advanced or during the execution of a decoding operation. Therefore, the CPU 21 must determine how much reception data was sent to the card. The transmission side yields to the reception side, so the phase relationship of the transmit and receive operations, that is, Capture→Encoding→Transmit and Receive→Decoding →Display, is automatically adjusted. As a result, the transmission side regain the frame rate.

Control in Signal Processing Unit 41

Next, an explanation will be made of the control actually carried out in the signal processing unit 41 of the video card 4. Note that, here, an explanation will be made of the processing of the signal processing unit 41 assuming the operations when carrying out a video conference by full duplex sequential communication.

First, the signal processing unit 41 carries out control for writing the image data in real time in the region A of the DRAM 47 while managing the addresses when the capture flag is set. At this time, the encoding flag is also set.

The signal processing unit 41 starts an encoding operation after writing 8 lines' worth of data. The image data is read out from the region A in units of macroblocks, then compression, including preprocessing, is executed.

Next, the signal processing unit 41 writes the encoded data in the region B while managing the addresses.

Further, when a read data command arrives from the CPU 21, the transmit flag is set and the signal processing unit 41 reads the encoded data from the B region in the horizontal/ vertical blanking periods and transfers the required number of samples to the main memory 22. The transmit flag is turned off with every end of transfer. Also, the number of all transferred samples is managed by the address management.

When the transfer of one frame's worth of encoded data is finished, the T-finish flag is set.

Further, when a write data command arrives from the CPU 21, the signal processing unit 41 first turns the receive flag on. Then, during an encoding operation, in the horizontal/vertical blanking period, this writes the number of required samples of the reception data transferred from the main memory 22 into the region D of the DRAM 47. It turns the receive flag off after ending the write operation. Further, when the encoding operation is not in process, the decoding flag is set, the number of required samples of the reception data is written into the region D of the DRAM 47, the data is read out from the region D, and a decoding operation is executed. The expanded data is written into the C region at any time. Note that, this is executed in periods other than the horizontal/vertical blanking periods.

Further, the signal processing unit 41 sets the R-finish flag when receiving one frame's worth of encoded data.

Further, the signal processing unit 41 turns the decoding flag off when ending one frame's worth of expansion. The remote-ready flag then is set.

Further, when a display remote command arrives from the CPU 21, the signal processing unit 41 reads the image data from the regions A and C of the DRAM 47 at the local and remote reading timing determined from the display position designated from the CPU 21 in advance and outputs the same toward the ZV port of the card I/F unit 45.

Status Transition

Figure 3:
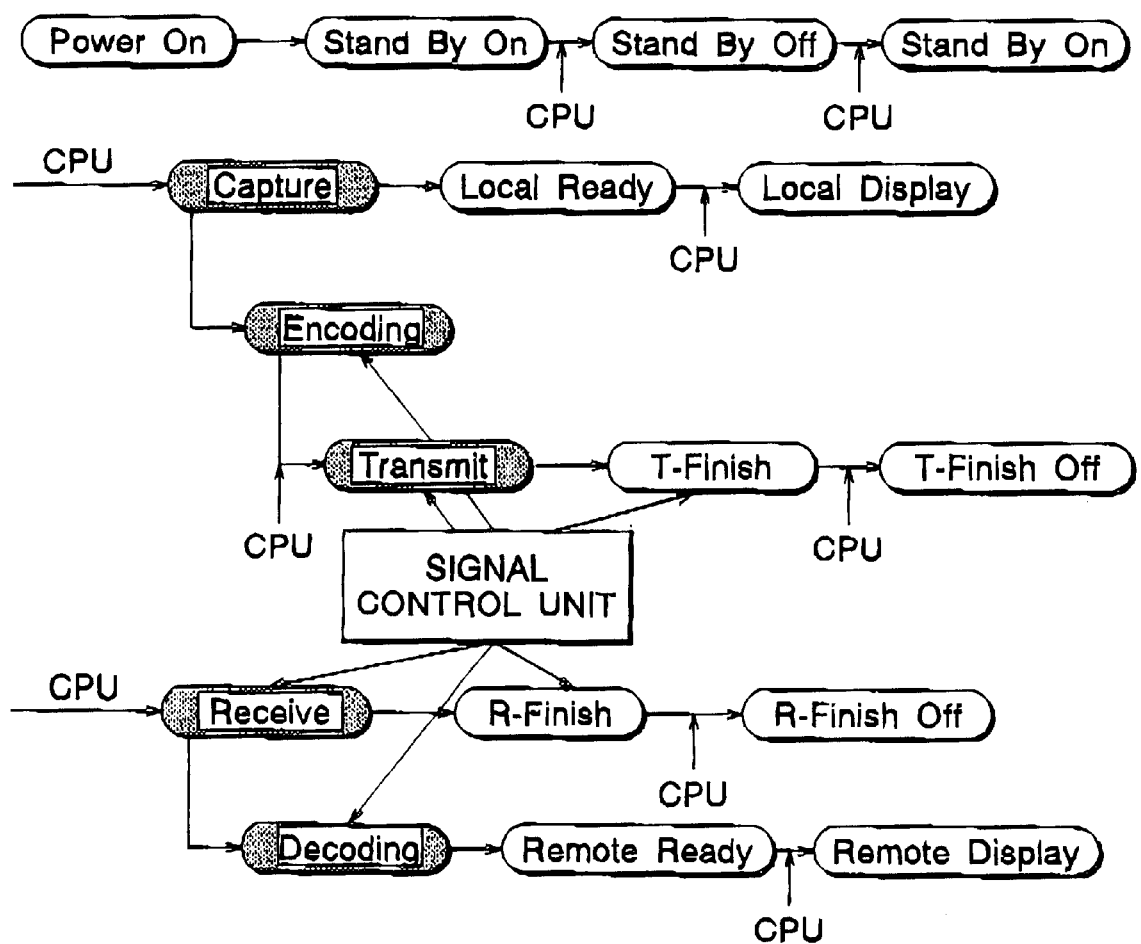
FIG. 3 is a view for explaining a sequential operation of status flags at the time of a real time communication mode.

Next, the state of transition of the status flags in the video card 4 due to this processing is shown in FIG. 3.

The stand-by state is a state which is automatically entered when the power is first turned on. It is later turned on or off by a command of the CPU 21.

When a capture operation is started by the CPU 21, encoding and transmit operations are sequentially executed by the time division multiplex mode. Note that the actual transmit operation is carried out by a command from the CPU 21. The actual control is carried out by the signal processing unit 41.

The receive operation is also started by the CPU 21. If the encoding operation is not being executed at that time, a decoding operation is possible. Both encoding and decoding operations, once started, are carried through until one frame's worth of data finishes being processed. No time division multiplex operation is carried out in the middle of a frame.

In receive/transmit operations, the signal processing unit 41 controls the actual transfer of data by time division multiplexing in accordance with commands of the CPU 21 in the blanking period of the TV synchronization signal.

DRAM 47 Access Control

Here, an explanation will be made of the control of access of the DRAM 47 in the video card 4 by referring to FIG. 4.

The severest case in the control of access to the DRAM 47 by the signal processing unit 41 is the simultaneous execution of capture and encoding operations. At this time, the video is fetched into the region A of the DRAM 47 and simultaneously transferred to the signal processing unit 41 for compression and encoding in the intervals between the sampling periods. The encoded data is written into the region B of the DRAM 47. Thereafter, a read data command arrives from the CPU 21 and the transmit mode is entered.

Figure 4:
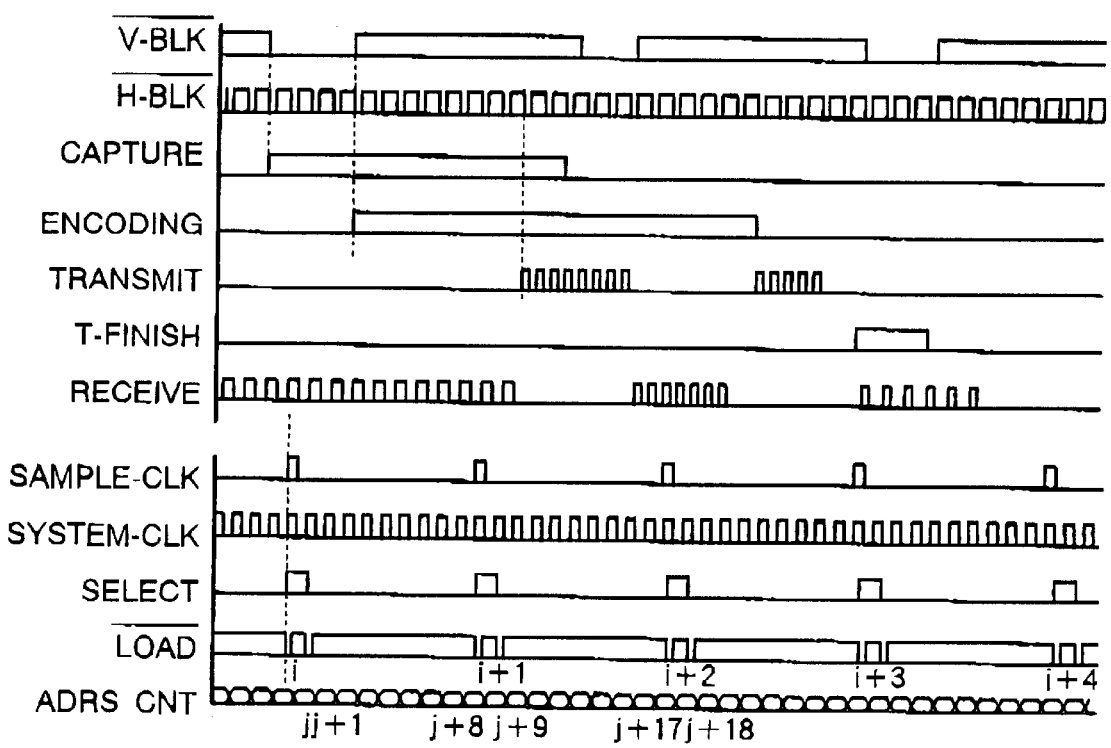
FIG. 4 is a view for explaining control of access to the DRAM shown in FIG. 2.

In the first half of the timing chart shown in FIG. 4, the flow Capture→Encoding→Transmit is shown. Note that in FIG. 4, the time axis is shown considerably shortened. The 8-line delay from the encoding operation to the transmit operation is due to block encoding. When carrying out the preprocessing, this becomes overhead.

In the transmit part, busy periods are intermittently generated during the encoding operation, therefore an intermittent state is shown. During such periods, a transmit operation yields to a receive operation. Both transmit and receive operations are executed by a clock sent from the CPU 21 side.

Since the signal processing unit 41 executes encoding and/or decoding operations including control of access to the DRAM 47, the switching between transmit and receive operations is carried out by the signal processing unit 41. Namely, in the above case, the signal processing unit 41 sends an interrupt to the CPU 21 and makes the CPU 21 issue a write/read data command. That is, a transmit operation is carried out with priority immediately after a certain unit of encoding is finished so that the transmission data will not be exhausted in the main memory 22.

The latter half portion of FIG. 4 shows a situation where capture and encoding operations are executed by time division multiplexing. For this reason, two address registers are provided: one for the capture operation and the other for the encoding operation. In any case, whenever one memory access is finished, the address counter is incremented. At the time of switching of operations, this incremented address is loaded into each register to prepare for the next operation.

The signal processing unit 41 receives the parameters for the block transfer accompanying a Write/Read Data command from the CPU 21 in advance in addition to the compression rate, transmission speed, and other basic parameters and manages the addresses for complexly intermittently accessing the regions A to D of the DRAM 47 based on them.

Operation of Video Data Communication Apparatus 1

Next, an explanation will be made of the detailed operation of the video data communication apparatus 1 referring to FIG. 5 to FIGS. 7A and 7B.

Figure 5:
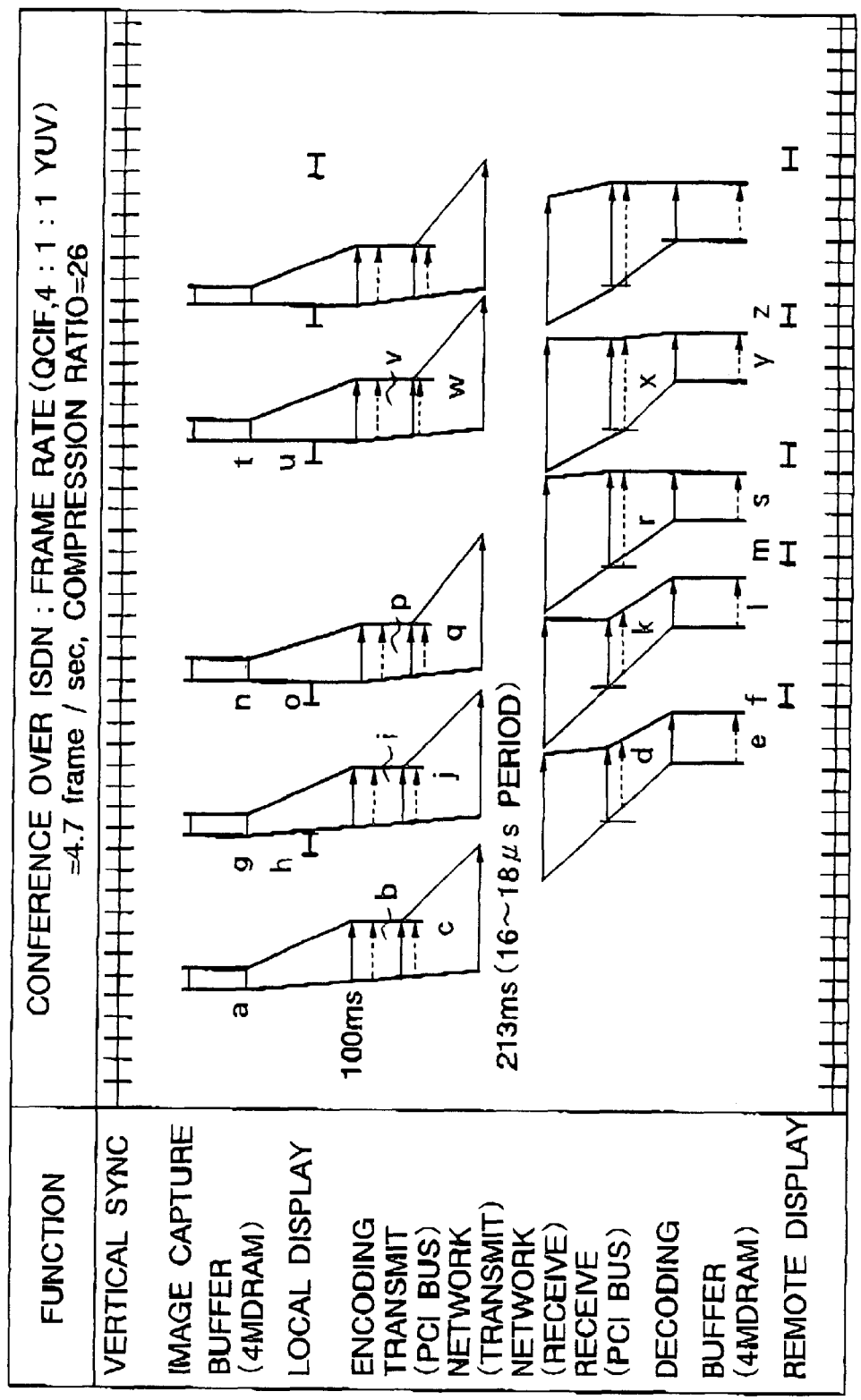
FIG. 5 is a view of a timing chart at the time of execution of a video conference by full duplex communication via an ISDN line.
Figure 6:
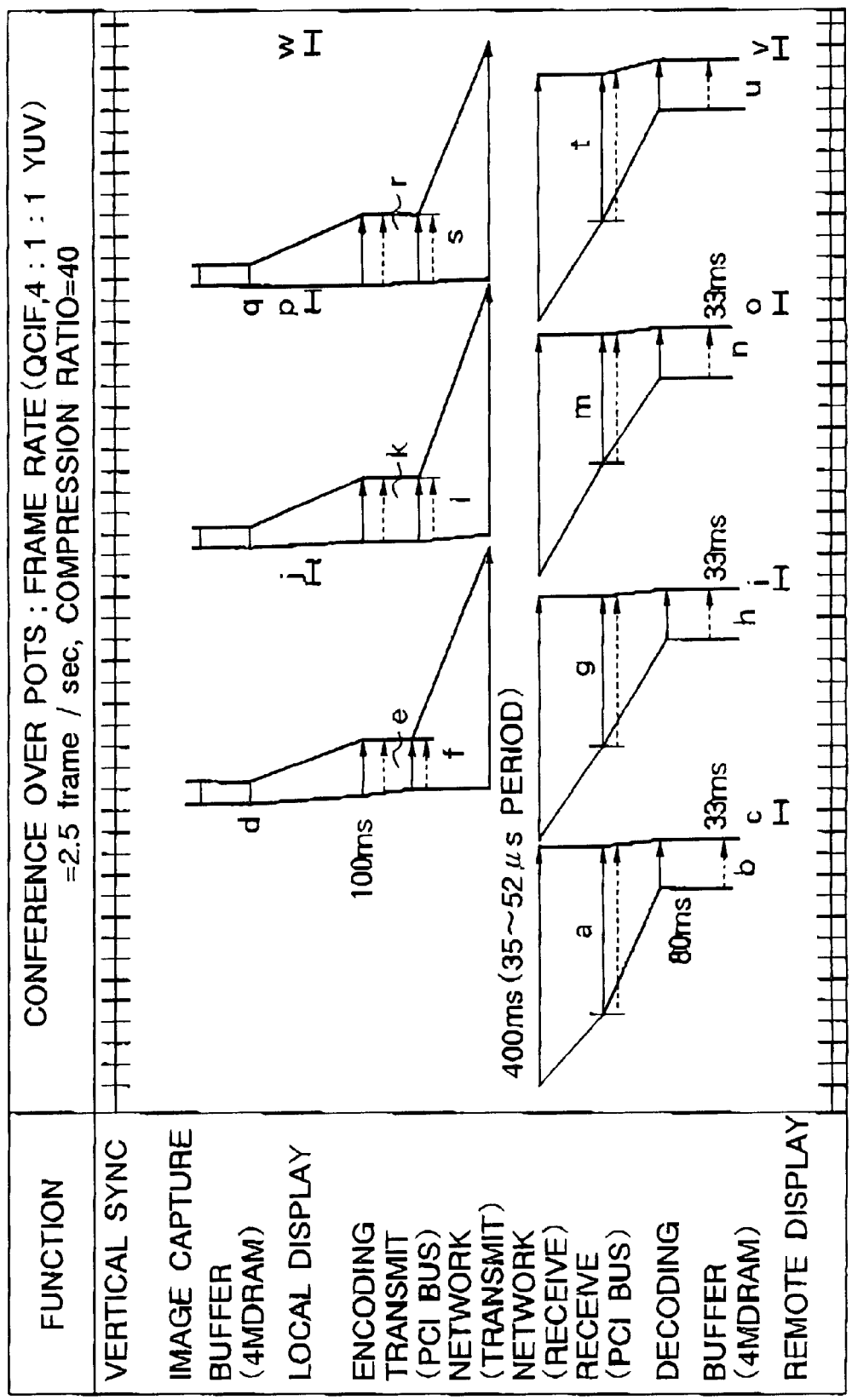
FIG. 6 is a view of a timing chart at the time of execution of a video conference by full duplex communication via a POTS line.

FIG. 5 and FIG. 6 are timing charts at the time of a video conference using full duplex communication. FIG. 5 shows the case of communication with an external apparatus via a network over an ISDN line with a compression rate of 26× and with a transmission rate of 4.7 frames/sec, while FIG. 6 shows the case of communication with an external apparatus via a network over a conventional analog telephone line, that is, a POTS (Plain Old Telephone System) line, with a compression rate of 40× and with a transmission rate of 2.5 frames/sec. Note that it is assumed that it takes the signal processing unit 41 100 ms for compression of a QCIF image by pure software, including also the preprocessing, and 80 ms for expansion.

First, an explanation will be made of the operation shown in FIG. 5 and FIG. 6.

First, the video data is fetched from the camera into the video card 4 by a capture operation. The fetched video data is immediately recorded in the region A of the DRAM 47. The recorded video data is appropriately read simultaneously with the recording. The encoding operation is carried out by the signal processing unit 41. The encoded video data is recorded in the region B of the DRAM 47.

The encoded video data is successively transferred to the main memory 22 of the notebook type PC 2 and transmitted to the network via the communication I/F card 3.

Further, the video data received from the network is stored once in the main memory 22 and transferred to the region D of the DRAM 47 of the video card 4 so that the reception and transfer thereof are almost simultaneously finished. The transferred video data is sequentially read out and decoded by the signal processing unit 41 and recorded in the region C of the DRAM 47.

Next, immediately before the start of the next capture operation, the video data fetched before this which had been recorded in the region A of the DRAM 47 and the received video data which has been recorded in the region C are input as one series of video data to the VRAM 27 via the VGA controller 28 and displayed on the display 26.

In the example of the operation shown in FIG. 5, 100 ms is taken for encoding, 80 ms is taken for decoding, and 33 ms is taken for the display of one frame. Since the network uses an ISDN line, the processing in the signal processing unit 41 becomes the bottleneck and determines the processing speed. Further, in the example of operation shown in FIG. 6, the POTS network becomes the bottleneck.

Figure 7A:
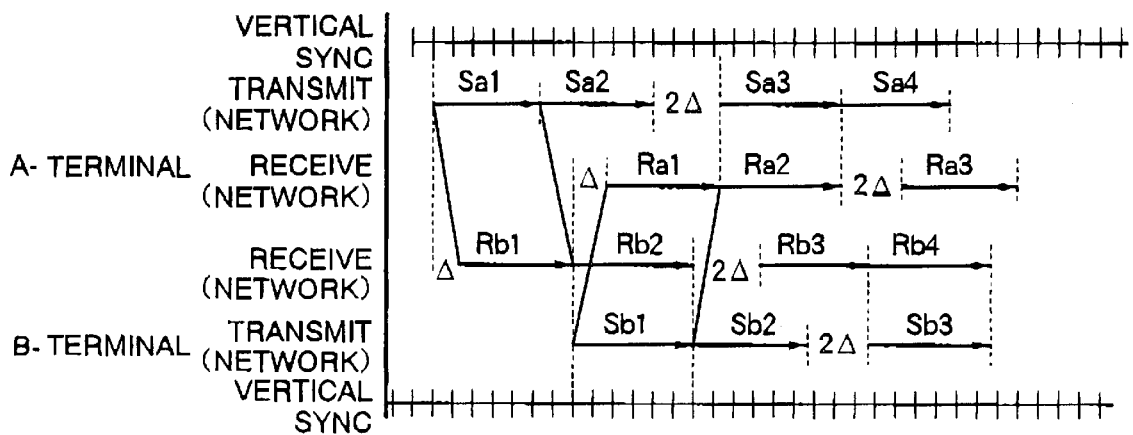
Figure 7B:
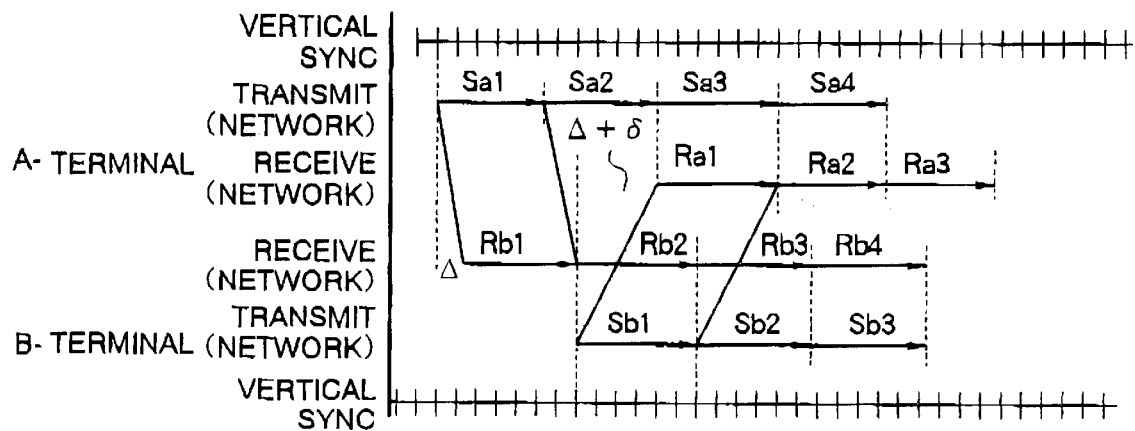

The state of processing of such full duplex communication is shown in FIGS. 7A and 7B.

In FIG. 7A, when defining the delay of the network as $\Delta$, the frame Sa1 transmitted from a station A reaches a station B with a delay of $\Delta$. This is Rb1. Next, Sb1 is transmitted from the station B. This reaches the station A with a delay of $\Delta$ and becomes Ra1. Due to this, priority is given to a receive operation depending on the relative relationship of the remaining amount of reception/transmission data in the main memory 22 at the terminal of the station A, the transmission of the station A is delayed by $2\Delta$, and an interval is formed between Sa2 and Sa3. This interval is propagated to the station B and becomes an interval between Rb2 and Rb3.

In this example, an interval of $2\Delta$ is introduced for every transmission of two frames. When $\Delta$ is small, the interval of $2\Delta$ is more apt to occur (the transmit operation is postponed when the remaining amount of reception data is larger than the transmission data in the main memory 22).

In general, if $n \cdot Tn - 2\Delta < Tn/2 (n=1, 2, \ldots)$ stands when $(n-1)Tn < 2\Delta < nTn$, that is, if $\Delta > (2n+1)Tn/4$, no interval is generated. In order to satisfy this relationship, for example, the station A monitors the loop delay ($2\Delta$) and makes the reception data stay for an excess time in the main memory 22 so as to satisfy the above equation. The timing chart showing this was explained previously.

FIG. 7B is a view of the full duplex communication in such a case.

In FIG. 7B, the station A adds an excess delay 6 to the actual network delay $\Delta$, adjusts the phase of the transmit/receive operation in the terminal, and thereby prevents the interval as previously mentioned from occurrence on the time axis.

Here, there is a concern that the reception data will overflow at the main memory 22 if this complicated time division multiplex processing is continued. However, the actual data reception rate is 128 kbps (7.8 $\mu$s cycle) even in the case of full duplex communication by an ISDN line. On the other hand, the transmission rate between the card and the PC is 128 Mbps, as the transmission clock is 8 MHz at the largest and the transmission is carried out by 16-bit parallel processing. This is 1000 times faster even compared with 128 kbps at the time of the full duplex communication of 64 kbps using an ISDN line. Accordingly, there is no worry of overflow.

In this way, in the video card 4 of the present embodiment, based on the strictly prescribed rule, the transmission processing and the reception processing of video data are carried out in a time division manner. For this reason, these processings can be carried out by one DRAM and one signal processor. In other words, by adopting the configuration as in the present embodiment, even a circuit comprised of just a DRAM and signal processor mounted on the card can suitably carry out the transmission processing and reception processing of the video data.

As explained above, according to the video card 4 of the present invention, processing regarding the transmission and reception of the video data with an external apparatus via a network such as the handling of the picture, encoding/decoding, and communication between the main memory and the video card, can be simultaneously carried out in real time for transmission and reception with the external apparatus via the network. When mounted in an information processing apparatus, for example, a notebook type PC, an environment enabling a television telephone system and television conference system to be suitably carried out can be provided in the information processing apparatus.

Further, according to the video data communication apparatus of the present invention, the processing accompanying real time bi-directional communication of video data can be suitably carried out by a simple configuration, that is, a cheap configuration, and a television telephone system, a television conference system, etc. can be realized.

What is claimed is:

1. A video card comprising:
   a memory means for recording video signals;
   a camera signal inputting means for converting video signals input from a camera device to an intended format and recording the same in said memory means;
   an encoding means for encoding said recorded input video signals and recording the encoded video signals in said memory means;
   a first transmitting means for transmitting said recorded encoded video signals to a host control device;
   a receiving means for receiving the encoded video signals transmitted by said host control device and recording the same in said memory means;
   a decoding means for decoding said recorded received encoded video signals and recording the decoded video signals in the memory means;
   a second transmitting means for transmitting said recorded decoded video signals to said host control device;
   a third transmitting means for transmitting said recorded input video signals to said host control device; and
   a controlling means for making predetermined means valid based on a control signal input from said host control device and making them carry out intended processings, wherein
   said encoding means and said decoding means are substantially constituted by one signal processing means,
   said first to third transmitting means and said receiving means are substantially constituted by one interface, and said means are contained in a card-like housing, and wherein receiving operations are given priority over transmission operations when the amount of reception data remaining in said memory means is greater than the amount of transmission data remaining in said memory means.

2. A video card as set forth in claim 1, further comprising a synchronization signal generating means for generating a predetermined television synchronization signal determined based on said video signal, and wherein said means carry out the processings in synchronization with the generated synchronization signal.

3. A video card as set forth in clam 2, wherein said memory means comprises:

a memory circuit having a first region for recording the video signals input via said camera signal inputting means, a second region for recording the video signals obtained by encoding said input video signals, a third region for recording the encoded video signals received via said interface means, and a fourth region for recording the video signals obtained by decoding said encoded video signals and constituted substantially by one semiconductor memory, and a memory circuit controlling means having a plurality of address counters and substantially independently carrying out recording/reproduction of signals with respect to said memory circuit.

4. A video card as set forth in claim 3, wherein said controlling means is substantially constituted by a logic circuit having a plurality of register means for recording variables indicating the internal state of the video card and by said signal processing means.

5. A video card as set forth in claim 3, wherein said controlling means simultaneously makes said camera signal inputting means and said encoding means valid according to need based on the control signal which is input to make them simultaneously carry out the recording of the video signals input from the camera device to said memory means and the encoding of said video signals.

6. A video card as set forth in claim 3, wherein; said controlling means simultaneously makes said second transmitting means and said third transmitting means valid, and said interface means transmits said decoded video signals and said input video signals to said host control device substantially by one transmission processing.

7. A video card as set forth in claim 3, wherein; said controlling means makes said first transmitting means valid simultaneously with said camera signal inputting means, said encoding means, and said decoding means according to need based on said input control signal, and said first transmitting means reads the encoded video signals from said memory means in horizontal and vertical blanking periods of the video signals when said means carry out the reading and recording with respect to said memory means and transmits the same to said host control device.

8. A video card as set forth in claim 3, wherein; said controlling means makes said receiving means valid simultaneously with said camera signal inputting means, said encoding means, and said decoding means according to need based on said input control signal, and said receiving means receives the encoded video signals transmitted from said host control device in horizontal and vertical blanking periods of the video signals when said means carry out the reading and recording with respect to said memory means and records the same in said memory means.

9. A video card as set forth in claim 3, wherein said interface means is a means for carrying out said communication with said host control device based on a PCMCIA standard, and comprises;

a basic inputting/outputting means for carrying out the transmission of video signals input from said camera signal input means and encoded and the reception of said encoded video signals, a format converting means for converting the video signals input from said camera signal input means and the video signals received at said receiving means and decoded at said decoding means to a format which can be immediately displayed on a display device of said host control device, and a ZV port outputting means for transmitting the format-converted video signals.

10. A video data communication apparatus wherein a video card is mounted in a control device, said video card comprising:
    a memory means for recording video signals;
    a camera signal inputting means for converting video signals input from a camera device to an intended format and recording the same on said memory means;
    an encoding means for encoding the recorded input video signals and recording the encoded video signals in said memory means;
    a first transmitting means for transmitting said recorded encoded video signals to said control device;
    a receiving means for receiving the encoded video signals transmitted by said control device and recording the same in said memory means;
    a decoding means for decoding said recorded received encoded video signals and recording the decoded video signals in said memory means;
    a second transmitting means for transmitting the recorded decoded video signals to said control device;
    a third transmitting means for transmitting said recorded input video signals to said control device; and
    a controlling means for making predetermined means valid based on a control signal input from said control device to make them carry out intended processings;
    wherein receiving operations are given priority over transmission operations when the amount of reception data remaining in said memory means is greater than the amount of transmission data remaining in said memory means; and said control device comprising:
    a transmission use video signal acquiring means for acquiring the video signals which are input from the camera device and encoded in said video card as the transmission use video signals;
    a transmitting means for transmitting said acquired video signals via a communication line;
    a receiving means for receiving the encoded video signals via the communication line;
    a decoding instructing means for inputting said received encoded video signals to said video card and making this decode the same;

a display use video signal acquiring means for reading said decoded video signals and video signals which are input from said camera device but are not encoded from said video card as the display use video signals; and a displaying means for displaying said acquired video signals.

11. A video data communication apparatus as set forth in claim 10, wherein;

said control device issues instructions to said video card for making said means of said video card valid, and said video card operates independently based on said instructions.

12. A video data communication apparatus as set forth in claim 10, wherein;

said video card further comprises a synchronization signal generating means for generating a predetermined television synchronization signal determined based on the video signals, and said means of said video card operate by a synchronization signal independent form said control device.

13. A video data communication apparatus as set forth in claim 10, wherein a transfer of video signals between said control device and said video card is carried out in horizontal and vertical blanking periods of video signals during which said memory means is accessed by processing when processing is carried out in said camera signal inputting means, said encoding means, and said decoding means of the video card.

14. A video data communication apparatus as set forth in claim 10, wherein;

a transmission time of video signals of one frame which are transmitted and received via said communication line is larger than and almost equal to a total time of an encoding time of video signals of one frame in said encoding means of said video card, a decoding time of the video signals of one frame of said decoding means of said video card, and a time for transferring one frame's worth of video signals to said display use video signal acquiring means of said control device from said video card.

15. A video card comprising:

a memory means for recording video signals;

a camera signal inputting means for converting video signals input from a camera device to an intended format and recording the same in said memory means;

an encoding means for encoding said recorded input video signals and recording the encoded video signals in said memory means;

a first transmitting means for transmitting said recorded encoded video signals to a host control device;

a receiving means for receiving the encoded video signals transmitted by said host control device and recording the same in said memory means;

a decoding means for decoding said recorded received encoded video signals and recording the decoded video signals in the memory means;

a second transmitting means for transmitting said recorded decoded video signals to said host control device;

a third transmitting means for transmitting said recorded input video signals to said host control device;

a controlling means for making predetermined means valid based on a control signal input from said host control device and making them carry out intended processings; and a synchronization signal generating means for generating a predetermined television synchronization signal determined based on said video signal; wherein said memory means includes a memory circuit having a first region for recording the video signals input via said camera signal inputting means, a second region for recording the video signals obtained by encoding said input video signals, a third region for recording the encoded video signals received via said interface means, and a fourth region for recording the video signals obtained by decoding said encoded video signals and constituted substantially by one semiconductor memory, and a memory circuit controlling means having a plurality of address counters and substantially independently carrying out recording/reproduction of signals with respect to said memory circuit, said encoding means and said decoding means are substantially constituted by one signal processing means, said first to third transmitting means and said receiving means are substantially constituted by one interface, said means are contained in a card-like housing, and said means carry out the processings in synchronization with the generated synchronization signal.

16. A video card as set forth in claim 15, wherein said controlling means is substantially constituted by a logic circuit having a plurality of register means for recording variables indicating the internal state of the video card and by said signal processing means.

17. A video card as set forth in claim 15, wherein said controlling means simultaneously makes said camera signal inputting means and said encoding means valid according to need based on the control signal which is input to make them simultaneously carry out the recording of the video signals input from the camera device to said memory means and the encoding of said video signals.

18. A video card as set forth in claim 15, wherein;

said controlling means simultaneously makes said second transmitting means and said third transmitting means valid, and said interface means transmits said decoded video signals and said input video signals to said host control device substantially by one transmission processing.

19. A video card as set forth in claim 15, wherein;

said controlling means makes said first transmitting means valid simultaneously with said camera signal inputting means, said encoding means, and said decoding means according to need based on said input control signal, and said first transmitting means reads the encoded video signals from said memory means in horizontal and vertical blanking periods of the video signals when said means carry out the reading and recording with respect to said memory means and transmits the same to said host control device.

20. A video card as set forth in claim 15, wherein;

said controlling means makes said receiving means valid simultaneously with said camera signal inputting means, said encoding means, and said decoding means according to need based on said input control signal, and said receiving means receives the encoded video signals transmitted from said host control device in horizontal and vertical blanking periods of the video signals when said means carry out the reading and recording with respect to said memory means and records the same in said memory means.

21. A video card as set forth in claim 15, wherein said interface means is a means for carrying out said communication with said host control device based on a PCMCIA standard, and comprises;
a basic inputting/outputting means for carrying out the transmission of video signals input from said camera signal input means and encoded and the reception of said encoded video signals,
a format converting means for converting the video signals input from said camera signal input means and the video signals received at said receiving means and decoded at said decoding means to a format which can be immediately displayed on a display device of said host control device, and
a ZV port outputting means for transmitting the format-converted video signals.

22. A video data communication apparatus wherein a video card is mounted in a control device,
said video card comprising:
a memory means for recording video signals;
a camera signal inputting means for converting video signals input from a camera device to an intended format and recording the same on said memory means;
an encoding means for encoding the recorded input video signals and recording the encoded video signals in said memory means;
a first transmitting means for transmitting said recorded encoded video signals to said control device;
a receiving means for receiving the encoded video signals transmitted by said control device and recording the same in said memory means;
a decoding means for decoding said recorded received encoded video signals and recording the decoded video signals in said memory means;
a second transmitting means for transmitting the recorded decoded video signals to said control device;
a third transmitting means for transmitting said recorded input video signals to said control device; and
a controlling means for making predetermined means valid based on a control signal input from said control device to make them carry out intended processings; and
said control device comprising:
a transmission use video signal acquiring means for acquiring the video signals which are input from the camera device and encoded in said video card as the transmission use video signals;
a transmitting means for transmitting said acquired video signals via a communication line;
a receiving means for receiving the encoded video signals via the communication line;
a decoding instructing means for inputting said received encoded video signals to said video card and making this decode the same;
a display use video signal acquiring means for reading said decoded video signals and video signals which are input from said camera device but are not encoded from said video card as the display use video signals; and
a displaying means for displaying said acquired video signals;
wherein a transfer of video signals between said control device and said video card is carried out in horizontal and vertical blanking periods of video signals during which said memory means is accessed by processing when processing is carried out in said camera signal inputting means, said encoding means, and said decoding means of the video card.

23. A video data communication apparatus wherein a video card is mounted in a control device,
said video card comprising:
a memory means for recording video signals;
a camera signal inputting means for converting video signals input from a camera device to an intended format and recording the same on said memory means;
an encoding means for encoding the recorded input video signals and recording the encoded video signals in said memory means;
a first transmitting means for transmitting said recorded encoded video signals to said control device;
a receiving means for receiving the encoded video signals transmitted by said control device and recording the same in said memory means;
a decoding means for decoding said recorded received encoded video signals and recording the decoded video signals in said memory means;
a second transmitting means for transmitting the recorded decoded video signals to said control device;
a third transmitting means for transmitting said recorded input video signals to said control device; and
a controlling means for making predetermined means valid based on a control signal input from said control device to make them carry out intended processings; and
said control device comprising:
a transmission use video signal acquiring means for acquiring the video signals which are input from the camera device and encoded in said video card as the transmission use video signals;
a transmitting means for transmitting said acquired video signals via a communication line;
a receiving means for receiving the encoded video signals via the communication line;
a decoding instructing means for inputting said received encoded video signals to said video card and making this decode the same;
a display use video signal acquiring means for reading said decoded video signals and video signals which are input from said camera device but are not encoded from said video card as the display use video signals; and
a displaying means for displaying said acquired video signals;
wherein a transmission time of video signals of one frame which are transmitted and received via said communication line is larger than and almost equal to a total time of an encoding time of video signals of one frame in said encoding means of said video card, a decoding time of the video signals of one frame of said decoding means of said video card, and a time for transferring one frame's worth of video signals to said display use video signal acquiring means of said control device from said video card.

* * * * *